(12) United States Patent  
Park et al.

(10) Patent No.: US 8,746,781 B2
(45) Date of Patent: Jun. 10, 2014

(54) REINFORCING UNIT FOR VEHICLE BODY

(71) Applicant: Hyundai Motor Company, Seoul (KR)

(72) Inventors: Ki Bong Park, Seoul (KR); Joonam Kim, Yongin-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 13/708,806

(22) Filed: Dec. 7, 2012

(65) Prior Publication Data

US 2014/0049069 A1    Feb. 20, 2014

(30) Foreign Application Priority Data

Aug. 20, 2012 (KR) .................. 10-2012-0090918

(51) Int. Cl.
*B62D 25/08* (2006.01)
(52) U.S. Cl.
USPC ................................ 296/187.09; 296/203.02
(58) Field of Classification Search
USPC ............... 296/187.09, 187.1, 187.12, 193.09, 296/198, 203.02, 203.03
See application file for complete search history.

(56) References Cited

U.S. PATENT DOCUMENTS 7,052,076 B2 * 5/2006 Kim .................. 296/187.09
7,219,954 B2 * 5/2007 Gomi et al. .............. 296/203.02

FOREIGN PATENT DOCUMENTS

| JP | 2003-291850 | | 10/2003 |
| JP | 2007-131143 | A | 5/2007 |
| KR | 20-0147950 | Y1 | 3/1999 |

* cited by examiner

*Primary Examiner* — Joseph Pape
*Assistant Examiner* — Dana Ivey
(74) *Attorney, Agent, or Firm* — Morgan, Lewis & Bockius LLP

(57) ABSTRACT

A reinforcing unit for the vehicle body may include an insert member coupled to a front side member while being inserted in the front side member, and a fender apron lower reinforce member mounted in a fender apron to be coupled to the insert member, so that crash energy transmitted to the fender apron in a front offset crash of the vehicle may be transmitted to the front side member through the reinforcing unit of the vehicle body to be effectively distributed.

6 Claims, 6 Drawing Sheets

REINFORCING UNIT FOR VEHICLE BODY

CROSS-REFERENCE TO RELATED APPLICATION

The present application claims priority to Korean Patent Application No. 10-2012-0090918 filed on Aug. 20, 2012, the entire contents of which is incorporated herein for all purposes by this reference.

BACKGROUND OF THE INVENTION

1. Field of the Invention

The present invention relates to a vehicle body reinforcing unit for reinforcing a vehicle body of a vehicle, and more particularly, to a reinforcing unit for a vehicle body for improving coupling rigidity between a front side member and a fender apron member.

2. Description of Related Art

Front side members configuring a front vehicle body of a vehicle in the related art are arranged at both left and right sides along a width direction of the vehicle and elongate along a longitudinal direction of the vehicle.

Further, a fender apron is a member for supporting power transmitted from a suspension apparatus while serving as a partition between wheels and an engine room and is mounted in and supported by the front side members.

That is, a fender apron front panel constituting the fender apron is attached to a front side outer member constituting the front side member by welding. A fender apron upper member constituting the fender apron is attached to the fender apron front panel by welding.

Further, in order to reinforce lower rigidity of the fender apron, a fender apron lower reinforce member is attached to the front side outer member by welding, and the fender apron upper member is attached to the fender apron lower reinforce member by welding.

The fender apron lower reinforce member and the fender apron front panel are attached to the front side outer member as flanges.

However, when a front offset crash occurs to a vehicle including a front vehicle body having the aforementioned connection structure between the front side members and the fender apron, a separate structure capable of effectively distributing crash energy is demanded.

That is, when the vehicle has a front offset crash of 25% with a small overlap barrier, the barrier cannot directly hit the side members but hits the fender apron region.

Accordingly, the side member is bent in a direction of the engine room without collapsing, but the front apron receives most of the crash energy of the barrier, so that the front apron low reinforce member absorbs the crash energy while being deformed by the crash energy.

However, the front apron low reinforce member is attached to the side member simply as the flange, so that connection rigidity therebetween is weak.

Accordingly, the front apron low reinforce member cannot appropriately transmit and distribute the received crash energy to the side members, so that an appropriate method therefore is demanded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a reinforcing unit for a vehicle body having advantages of improving safety of a vehicle and a passenger by appropriately transmitting crash energy received by a front apron to a front side member in a front offset crash of the vehicle and thus efficiently distributing crash energy.

In an aspect of the present invention, a reinforcing unit for a vehicle body may include an insert member inserted in a front side member and coupled thereto, and a fender apron lower reinforce member mounted in a fender apron and coupled to the insert member.

The insert member may include a tip end protruding outward of the front side member, wherein the fender apron lower reinforce member may include a coupling portion fitted to and coupled with the tip end of the insert member.

The front side member may include a front side inner member and a front side outer member which are coupled to each other to form a closed cross section, wherein the front side outer member may include a through hole communicated with the closed cross section, and wherein the tip end of the insert member protrudes through the through hole.

The insert member may include an insert upper member and an insert lower member which are coupled to each other, wherein the insert lower member may include a flange bent while extending outward and attached to the front side inner member at one side edge portion, and wherein the insert upper member may include a flange bent downward to be attached to the front side inner member.

The coupling portion of the fender apron lower reinforce member is formed while being bent with respect to a longitudinal direction of the fender apron lower reinforce member.

A bulk head is attached to a portion of the fender apron lower reinforce member positioned in an opposite direction to the coupling portion of the fender apron lower reinforce member.

A fender apron upper member is fitted to and coupled with a side surface of the portion to which the bulk head is attached.

A fender apron upper member is fitted to the fender apron lower member and coupled with the coupling portion and the bulk head.

A flange is formed to the front side outer member while protruding outward along an outside edge of the through hole, and the insert member is coupled to the flange.

In the exemplary embodiment of the present invention, the insert member is inserted in the front side member to be integrally and rigidly attached to the front side member, and the fender apron lower reinforce member is integrally and rigidly coupled to the insert member while covering the insert member.

Accordingly, when crash energy is transmitted to the fender apron lower reinforce member through the fender apron in the front offset crash of the vehicle, the crash energy is appropriately transmitted to the front side member through the insert member rigidly coupled to the fender apron lower reinforce member to be effectively distributed.

As described above, the crash energy transmitted to the fender apron is transmitted to the front side member to be effectively distributed, so that it is possible to prevent a local portion of the vehicle body from being excessively deformed due to concentration of the crash energy. Further, it is possible to prevent the transmission of the excessive crash energy to components mounted in the vehicle body and passengers of the vehicle, thereby improving crash stability of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
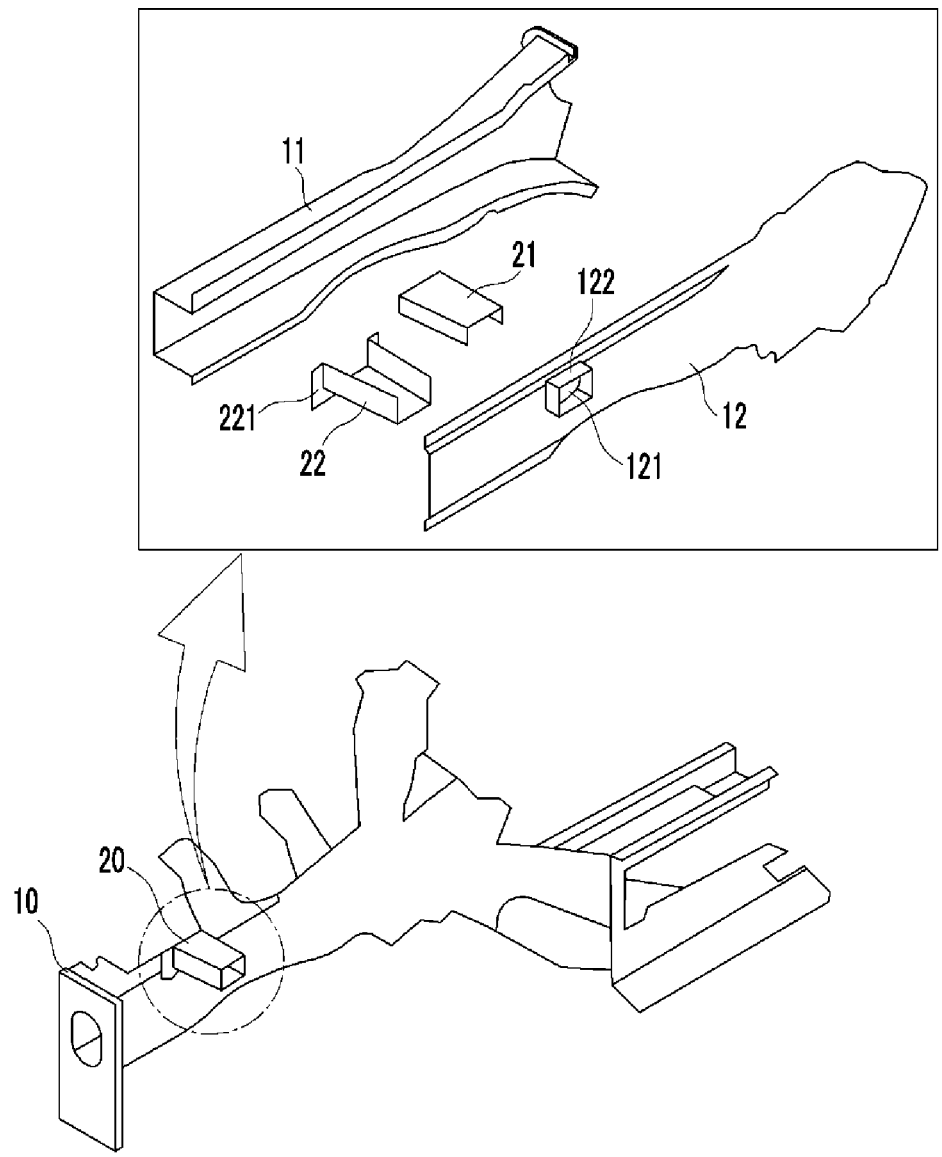
FIG. 1 is a coupled and exploded perspective view of an insert member inserted in a front side member and the front side member according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Referring to FIG. 1, a reinforcing unit for a vehicle body according to an exemplary embodiment of the present invention includes an insert member 20 integrally coupled with a front side member 10 while being inserted in the front side member 10.

The front side member 10 includes a front side inner member 11 elongated in a longitudinal direction of a vehicle and a front side outer member 12 generally shaped like a flat plate and elongated in a longitudinal direction of the vehicle, and the front side inner member 11 and the front side outer member 12 are combined with each other to form a closed cross section.

The insert member 20 is formed in an appropriate size so as to be inserted inside the closed cross section and protrude from an exterior of the front side outer member 12.

A through hole 121 communicated with the closed cross section is formed at a predetermined region of the front side outer member 12.

A flange 122 protruding outward along an outside edge is formed.

The insert member 20 has a form in which an insert upper member 21 is coupled with an insert lower member 22.

The insert upper member 21 is formed in a bracket shape, and the insert lower member 22 is also formed in a bracket shape.

A flange 221 extending outward is bent and integrally formed in one side edge portion of the insert lower member 22.

Figure 2:
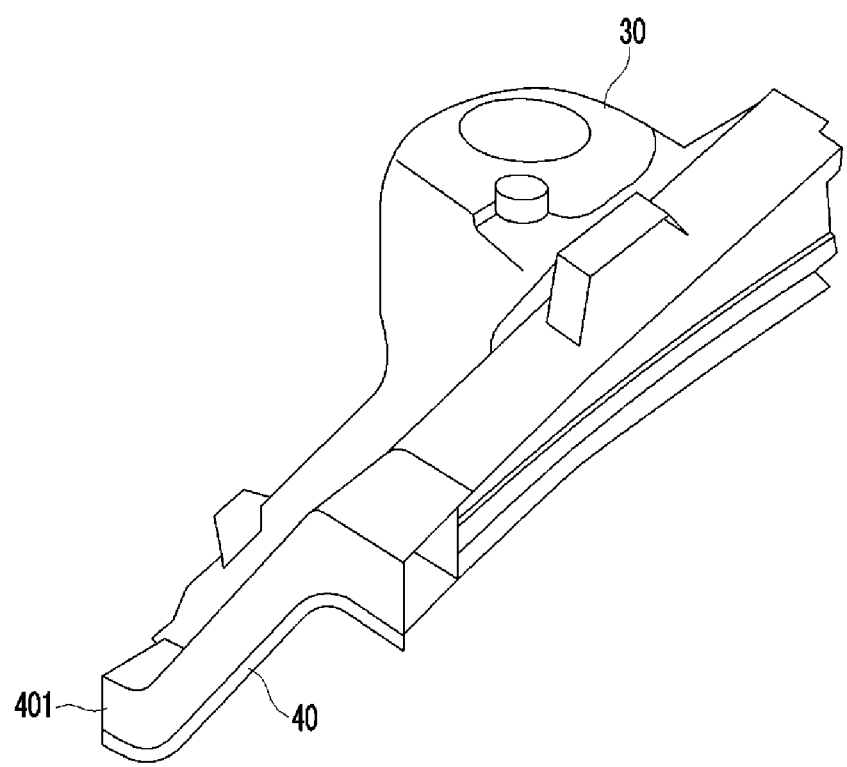
FIG. 2 is a perspective view of a fender apron coupled with a fender apron lower reinforce member according to an exemplary embodiment of the present invention.

Referring to FIG. 2, the reinforcing unit for the vehicle body according to the exemplary embodiment of the present invention includes a fender apron lower reinforce member 40 coupled to a fender apron 30.

The fender apron lower reinforce member 40 extends along the longitudinal direction of the vehicle.

Figure 3:
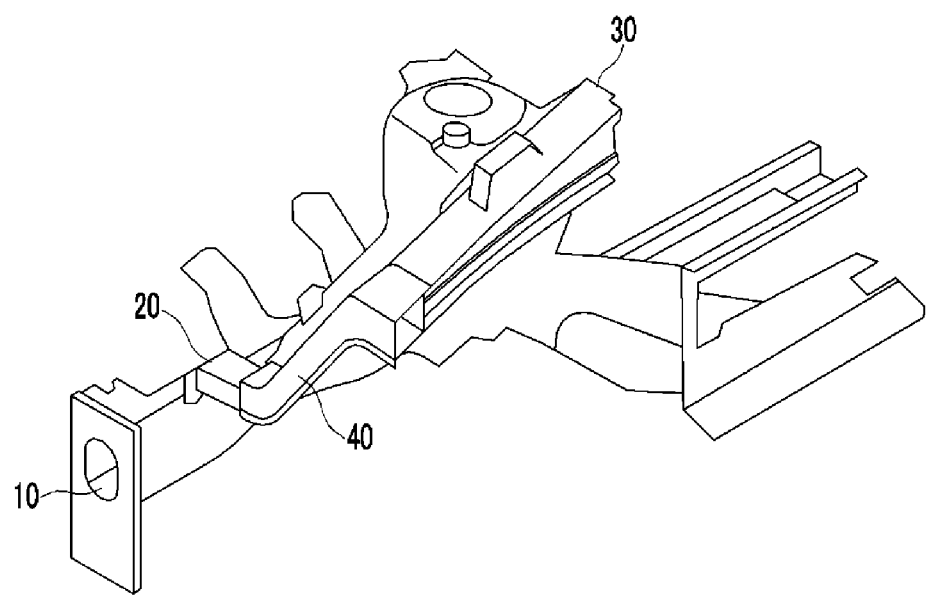
FIG. 3 is a perspective view of coupling of a front side member and a fender apron coupled with a reinforcing unit according to an exemplary embodiment of the present invention.

A coupling portion 404 of the fender apron lower reinforce member 40 connected to the fender apron 30 is fitted to a tip end 25 of the insert member 20 protruding through the through hole 121 as illustrated in FIG. 3 so that the insert member 20 is coupled to the coupling portion 404.

The coupling portion 404 is formed in a shape perpendicularly bent with respect to a longitudinal direction of the fender apron lower reinforce member 40.

Figure 4:
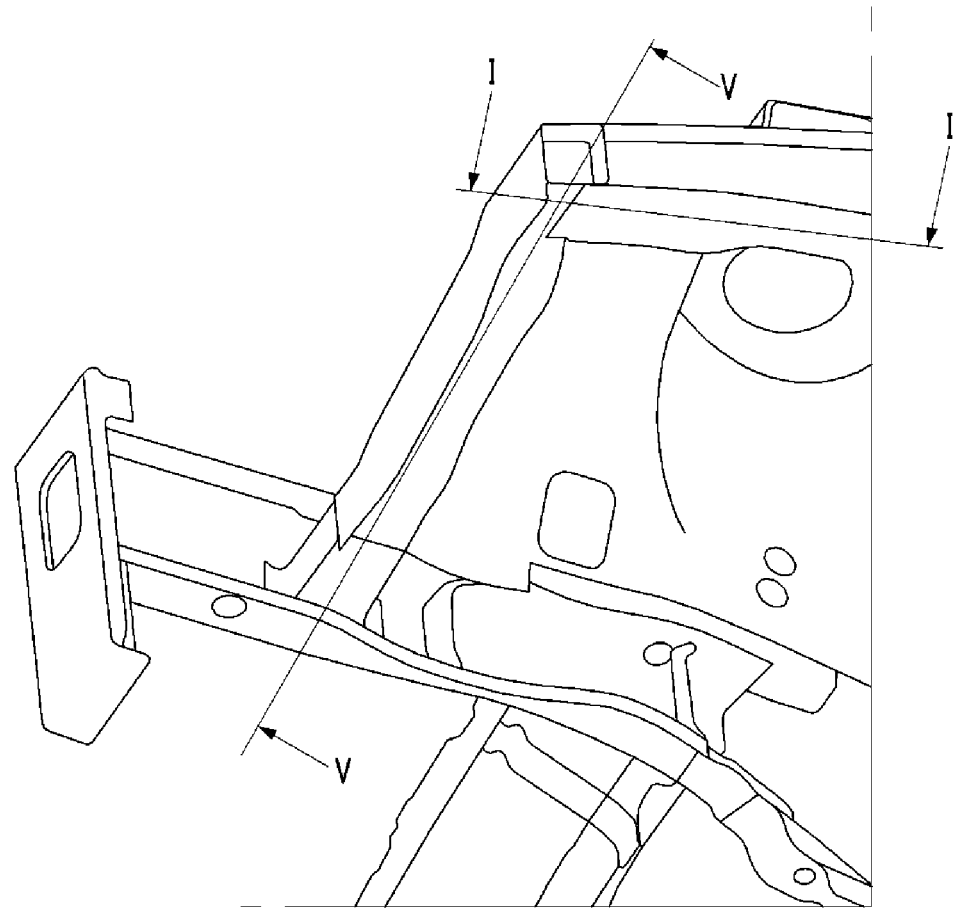
FIG. 4 is a perspective bottom view of coupling of a front side member and a fender apron coupled with a reinforcing unit according to an exemplary embodiment of the present invention.
Figure 5:
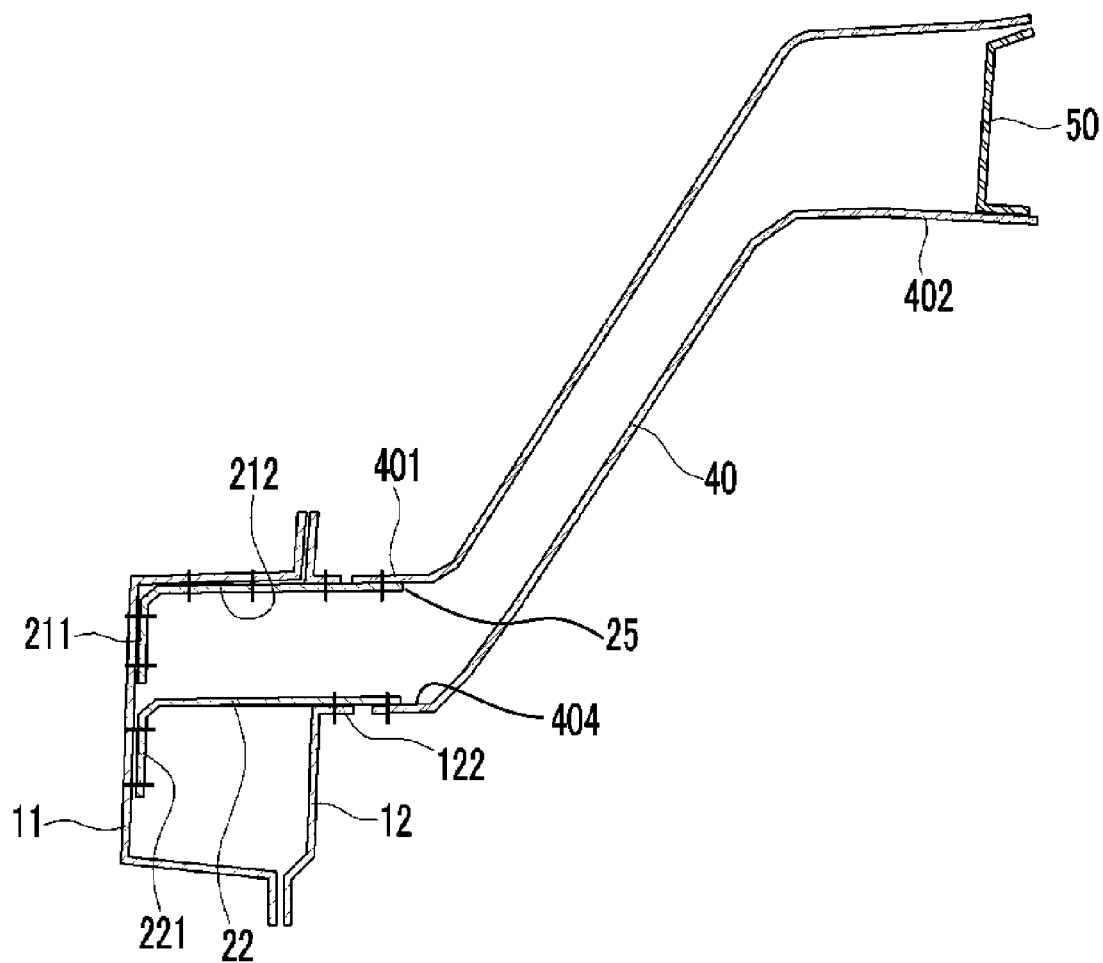
FIG. 5 is a cross-sectional view taken along line V-V of FIG. 4.
Figure 6:
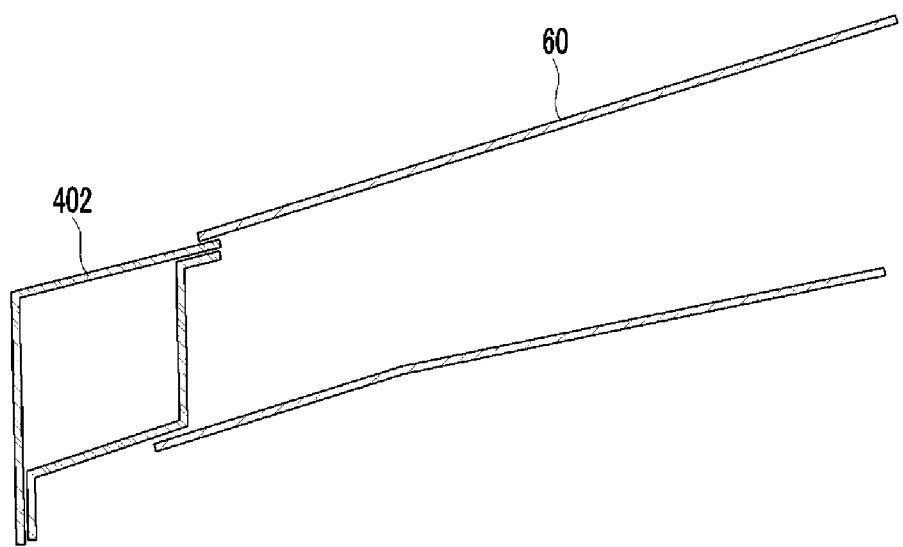
FIG. 6 is a cross-sectional view taken along line I-I.

Referring to FIGS. 4 to 6, a bulk head 50 closing the closed cross section of the fender apron lower reinforce member 40 is attached to a predetermined portion 402 of the fender apron lower reinforce member 40 positioned in an opposite direction to the coupling portion 404 of the fender apron lower reinforce member 40.

The bulk head 50 is formed to have a thickness of 1.0 t so as to have minimum rigidity, but it is not essentially limited thereto.

One end of a fender apron upper member 60 is fitted to a side surface of the predetermined portion 402 to be coupled and the fender apron upper member 60 includes a coupling portion 401 which is connected to the insert upper member 21.

The insert upper member 21 includes a flange 211 bent downward, the flange 211 is attached to an inside surface of the front side inner member 11 by welding, and a flat upper surface 212 of the insert upper member 21 is attached to an inside surface of the front side inner member 11 by welding.

The flange 221 of the insert lower member 22 is attached to the inside surface of the front side inner member 11 under the flange 211 by welding.

Further, each of the insert upper member 21 and the insert lower member 22 is coupled to the flange 122 formed at a peripheral edge of the through hole 121 by welding in a state where the insert member 20 protrudes outward while passing through the through hole 121 of the front side outer member 12.

The coupling portion 404 of the fender apron lower reinforce member 40 is fitted to a portion of the insert member 20 protruding through the through hole 121 and the insert member 20 and the coupling portion 404 are coupled by welding.

As described above, the fender apron 30 and the front side member 10 are integrally rigidly coupled to each other through the insert member 20 and the fender apron lower reinforce member 40 according to the exemplary embodiment of the present invention.

Accordingly, when crash energy is applied to the fender apron in the front offset crash of the vehicle, the crash energy is appropriately transmitted to the front side member through the reinforcing unit according to the exemplary embodiment of the present invention and effectively distributed.

Accordingly, it is possible to prevent the vehicle body from being excessively deformed due to concentration of the crash energy, and effectively reduce the crash energy transmitted to the vehicle body, mounted components, and passengers, thereby more safely protecting the vehicle body, mounted components, and passengers.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A reinforcing unit for a vehicle body, comprising:
    an insert member inserted in a front side member and coupled thereto; and
    a fender apron lower reinforce member disposed between a fender apron and the insert member and connecting the fender apron and the insert member;
    wherein the insert member includes a tip end protruding outward of the front side member;
    wherein the fender apron lower reinforce member includes a coupling portion fitted to and coupled with the tip end of the insert member;
    wherein the front side member includes a front side inner member and a front side outer member which are coupled to each other to form a closed cross section;
    wherein the front side outer member includes a through hole;
    wherein the tip end of the insert member protrudes through the through hole;
    wherein the insert member includes an insert upper member and an insert lower member which are coupled to each other;
    wherein the insert lower member includes a flange bent while extending outward and attached to the front side inner member at one side edge portion of the flange; and
    wherein the insert upper member includes a flange bent downward to be attached to the front side inner member.

2. The reinforcing unit of claim 1, wherein the fender apron lower reinforce member is bent with respect to a longitudinal direction of the fender apron lower reinforce member and includes the coupling portion at an end of the fender apron lower reinforce member.

3. The reinforcing unit of claim 1,
    wherein a bulk head is attached to a portion of the fender apron lower reinforce member, and
    wherein the portion of the fender apron lower reinforce member is positioned in an opposite direction to the coupling portion of the fender apron lower reinforce member.

4. The reinforcing unit of claim 3, wherein a fender apron upper member is fitted to and coupled with a side surface of the portion of the fender apron lower reinforce member.

5. The reinforcing unit of claim 3,
    wherein a fender apron upper member is fitted to the fender apron lower member and coupled with the bulk head, and
    wherein the fender apron upper member includes a coupling portion which is connected to the insert member.

6. The reinforcing unit of claim 1,
    wherein the front side outer member protrudes outward along an outside edge of the through hole and includes a flange, and
    wherein the insert member is coupled to the flange.

* * * * *